US008482144B2

(12) United States Patent
Khedekar et al.

(10) Patent No.: US 8,482,144 B2
(45) Date of Patent: Jul. 9, 2013

(54) VERTICAL AXIS WIND TURBINE WITH ELECTRONICALLY CONTROLLED ASSISTED START MECHANISM AND CONTROLLED AIRFLOW

(76) Inventors: Samit A. Khedekar, Schaumburg, IL (US); Mayura M. Gandhi, Schaumburg, IL (US); Sanjay A. Khedekar, Mumbai (IN)

( * ) Notice: Subject to any disclaimer, the term of this patent is extended or adjusted under 35 U.S.C. 154(b) by 0 days.

(21) Appl. No.: 13/301,755

(22) Filed: Nov. 21, 2011

(65) Prior Publication Data
US 2012/0061965 A1 Mar. 15, 2012

(51) Int. Cl.
*F03D 7/06* (2006.01)
(52) U.S. Cl.
USPC .......................................................... 290/44
(58) Field of Classification Search
USPC ..................................... 290/44, 55
See application file for complete search history.

(56) References Cited

U.S. PATENT DOCUMENTS

| 4,464,579 A * | 8/1984 | Schwarz | 290/44 |
| 4,474,529 A * | 10/1984 | Kinsey | 415/4.2 |
| 7,880,322 B2 * | 2/2011 | Cumings et al. | 290/54 |
| 8,154,145 B2 * | 4/2012 | Krauss | 290/54 |
| 2011/0158787 A1 * | 6/2011 | Thacker, II | 415/1 |

FOREIGN PATENT DOCUMENTS

| BE | 1007505 A7 * | 7/1995 |
| DE | 3631709 A * | 3/1988 |
| DE | 3724183 A1 * | 2/1989 |

* cited by examiner

*Primary Examiner* — Joseph Waks
(74) *Attorney, Agent, or Firm* — Richards Patent Law P.C.

(57) ABSTRACT

A wind turbine generator includes: a rotor including a vertical shaft and blades radially extending from the shaft, the rotor is characterized by a breakaway torque that is greater than the torque required to maintain rotation; a generator operationally coupled to the rotor shaft; a rotatable airfoil shaped housing enclosing at least a portion of the rotor blades and exposing at least a portion of the rotor blades; a motor mechanism operatively coupled to the rotor shaft; sensors adapted to determine wind speed; a processor operatively coupled to the sensors and the motor mechanism, wherein, in reaction to input received from the sensors, the processor provides a control signal to the motor mechanism to assist the rotation of the rotor shaft when the wind speed is below the speed needed to induce breakaway torque and above the threshold required to rotate the rotor once the initial resistance is overcome.

5 Claims, 6 Drawing Sheets

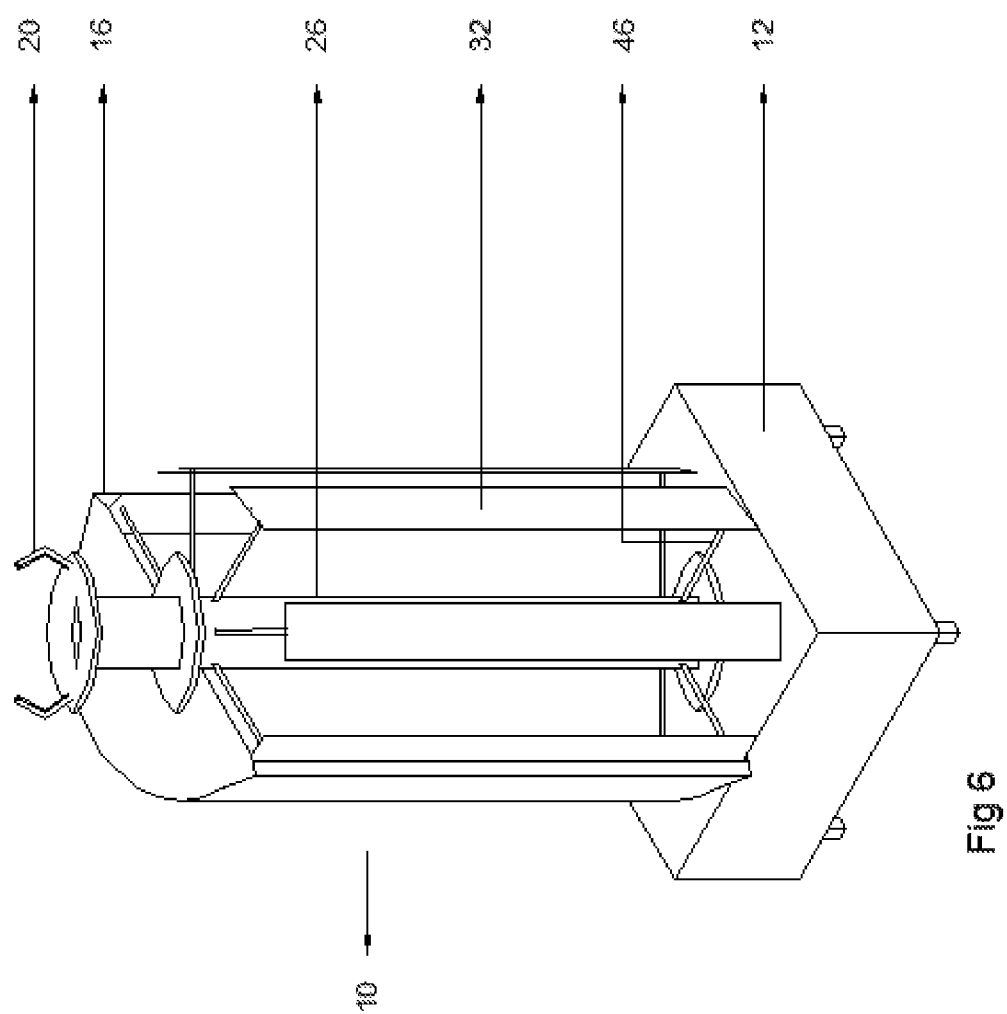

VERTICAL AXIS WIND TURBINE WITH ELECTRONICALLY CONTROLLED ASSISTED START MECHANISM AND CONTROLLED AIRFLOW

BACKGROUND OF THE INVENTION

Wind turbines are used to generate energy by harnessing power generated by wind flow. Wind turbines generally work by converting kinetic energy from the wind into mechanical energy. The wind turns a rotor that is connected to a generator, which in turn generates electricity.

Wind turbines are inherently inefficient at low wind speeds and when the wind changes direction.

At low wind speeds, the torque created by the wind against the rotor may not be large enough to overcome the turbine's initial resistance to rotation. However, that same wind speed may be powerful enough to maintain the rotational speed of a turbine already in motion. As a result, the turbine may never even get started at wind speeds that would be adequate to produce energy. Typical wind turbines lose out on the energy that would be generated if they were able to overcome their initial resistance to rotation.

Accordingly, a need exists for a wind turbine with improved efficiency, particularly a wind turbine that operates at wind speeds below the speed needed to induce breakaway torque and above the threshold required to power the rotor once the initial resistance is overcome.

In addition, typical wind turbines have exposed rotors. When wind changes directions, the wind against the previously leeward side slows the rotor slows the rotation. In addition, even without changing wind directions, the wind force against the leeward side reduces efficiency.

Therefore, a need exists to provide a wind turbine that shields the rotor from aerodynamic inefficiencies created by the incident wind pressure against the leeward side of the rotor.

Further, exposed rotors can be a physical hazard. As a result, there is a need for improving the safety of wind turbines, particularly by reducing the danger imposed by the rotor mechanism.

SUMMARY OF THE INVENTION

The needs described above are met by the solutions provided herein. The present invention provides a turbine, which converts wind energy into mechanical energy and then into electric power using a generator. While primarily described as a wind turbine, it is understood that fluids other than wind can be used to drive the turbine. The primary embodiment of the turbine is a vertical axis, wind turbine, but it is contemplated that the wind turbine may be oriented in other directions.

The solution provided herein is preferably provided in a vertical axis wind power generation system used to generate electricity or provide direct power to a mechanical device through a power transfer mechanism. Within the system, a rotor assembly with multiple blades is mounted on a shaft with bearing mounts with a power transfer mechanism consisting of a gear (or multiple gears), which drives the power generator or mechanical device. A movable housing is mounted coaxially about the rotor. The housing moves about the rotor to optimize wind flow to the turbine. In the preferred embodiment, an airfoil shaped housing is mounted on bearings designed to rotate around a vertical axis with a sufficient clearance for the free movement of the blades of the rotor and will be connected directly to a motor, which will change the orientation of the housing depending on the direction of the wind.

A wind-sensing device is set-up in the immediate vicinity of the system to sense wind direction and speed. This sensor transmits the wind speed and direction information to a controlling device. The controlling device includes intelligent decision-making capabilities and signals the actuation device to move the housing about the rotor. The motor is powered by a reserve power source, which may be charged by the power generator in the system. A part of the output power of the generator will be used to charge or provide power to the reserve power source to replenish the power source when it is drained or when the reserve power level falls below a predetermined level. The control device may determine the charging schedule of the reserve power source.

The controlling device will also signal the reserve power source to induce the rotor to start by reversing the flow of power using a start control mechanism when the rotational power of the wind speed is above a certain threshold or predetermined value. The controlling mechanism will stop the power flow to the starting mechanism when the rotor mechanism reaches a speed above a threshold value. The generator will then be switched back to the power generation mode.

The present invention, therefore, has the objective of providing a turbine having improved efficiency.

The invention has the further objective of providing a turbine which operates efficiently over a wide range of air or fluid flow rates and changes in wind direction, and which therefore is suitable for use where the incoming fluid flow varies randomly and wind direction is varied.

The invention therefore also has the objective of providing continuous rotation to the turbine thus facilitating continuous generation of power.

The invention therefore has the objective of making it more practical to produce electricity using wind power.

The invention is an improvement to a standard turbine, particularly in improving efficiency at times when the wind changes direction or the wind speed drops.

The present subject matter provides a turbine in which a rotor arrangement and power generator are used to induce rotation of the turbine when the wind flow is below the level sufficient to overcome the breakaway torque required to initiate rotation, but adequate to power the rotor once the initial resistance is overcome.

The present disclosure also provides a wind power generator system with an improved efficiency turbine by reducing the pressure of the wind on the leeward side, or reducing the incident wind flow on the part of the turbine rotor or blades where drag is induced, which otherwise would cause the turbine to slow down or lose rotational velocity. A pressure differential will be generated between the sides of the rotor, the first side, which is exposed to the wind, and the second side, which is encased in the airfoil shaped housing. This pressure differential will be directly incident on the blades of the rotor thus causing the rotor to spin at a higher speed than conventional turbines.

The combination of these improvements increases the operational range of the turbine by the virtue of lower wind speeds required to start the turbine and maintain the rotational speed of the turbine at lower speeds when compared to conventional wind power generator systems. The higher rotational speed of the turbine will mean more mechanical power, thus generating more electrical energy.

Additionally, most wind turbines need to be mounted at a height to afford clearance for the rotating blades and ensure safety. However, with the design presented herein, the turbine assembly and generator can be mounted at a lower height, including rooftops and on other structures with similar elevation. Also, with respect to the preferred embodiment, the vertical axis design also allows for mounting the assembly in spaces where the side-to-side clearance required will be less than the clearance required for a horizontal axis wind turbine.

Most wind turbine systems pose a hazard to the flying species, but this vertical axis wind system reduces the risk, as the blades will be partially enclosed and the general layout of the blades and the rotor will reduce the dangerous exposed areas when compared to a typical wind turbine.

This system will reduce noise pollution by arranging the blades to reduce the chop effect of the blades. The casing also supports a bearing mechanism thus reducing the mechanical stress load on the shaft, which will increase the life of the bearing, reducing the potential to fail and thus increase the life of the wind turbine.

This mechanism and control process can be used for multiple rotor shafts with different layouts.

In one example, a wind turbine consists of a rotor assembly affixed to a substantially vertical rotor shaft supported by bearings, the rotor assembly includes blades mounted where the shaft is housed in a bearing mechanism where the shaft rotates and provides mechanical rotational power by direct mechanical linkage to drive an electrical generator. The rotor assembly is enclosed in a movable housing shaped like a vertical airfoil or vertical wing like device, which reduces the drag or opposing forces on the turning rotor and blade assembly and increases the rotational force on the blades due to the formation of a pressure differential. A wind direction and speed sensing device is provided, which signals an actuation device to move the housing chamber to provide controlled wind flow to the blades. A mechanism is provided to induce the rotor to turn when stopped and switch off the power generator when the wind speeds are higher than the rated capacity of the generator. These arrangements are especially useful in harnessing wind power when the wind speed is low.

In another example, a wind turbine generator includes: a rotor including a substantially vertical shaft and plurality of blades radially extending from the shaft, wherein the rotor is characterized by a breakaway torque that is greater than the torque required to maintain rotation; a generator operationally coupled to the rotor shaft; a rotatable airfoil shaped housing enclosing at least a portion of the rotor blades and exposing at least a portion of the rotor blades; a motor mechanism operatively coupled to the rotor shaft; one or more sensors adapted to determine wind speed; and a processor operatively coupled to the one or more sensors and the motor mechanism, wherein, in reaction to input received from the one or more sensors, the processor provides a control signal to the motor mechanism to assist the rotation of the rotor shaft when the wind speed is below the speed needed to induce breakaway torque and above the threshold required to rotate the rotor once the initial resistance is overcome.

In certain examples, the wind turbine further includes a control mechanism operationally coupled to the processor and airfoil, wherein the one or more sensors are further adapted to determine wind direction, further wherein the control mechanism receives a control signal from the processor to rotate the housing based on wind direction as determined by the one or more sensors. The housing may rotate to be oriented to reduce drag on the side of the rotor which is moving against the direction of the wind and provide additional rotational force on the side of the rotor which is moving in the same direction as the wind flow, due to pressure differential effect from the airfoil. The processor may provide a control signal to the motor mechanism to restrict the rotation of the rotor shaft when the wind speed is above a predetermined speed. The wind turbine may include a reserve power supply operatively coupled to the motor mechanism. The reserve power supply may be controlled by the processor to recharge based on a charging schedule provided by the processor and the charging schedule may be based on wind speed determined by the one or more sensors.

An advantage of the wind turbine presented herein is improved efficiency at low wind speeds.

Another advantage of the wind turbine presented herein is improved efficiencies during changing wind directions.

A further advantage of the wind turbine presented herein is an increased operational range of wind speeds.

Yet another advantage of the wind turbine presented herein is a reduced danger from exposed rotor blades.

Still another advantage of the wind turbine presented herein is a reduction of noise pollution.

Moreover, it is an advantage of the wind turbine presented herein that the casing and bearing mechanism presented herein increases the life of the bearing assembly.

Additional objects, advantages and novel features of the wind turbine will be set forth in part in the description which follows, and in part will become apparent to those skilled in the art upon examination of the following description and the accompanying drawings or may be learned by production or operation of the examples. The objects and advantages of the concepts and solutions provided herein may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 is a perspective view of another example of a wind turbine generator assembly, illustrating an alternate blade layout.

DETAILED DESCRIPTION OF THE INVENTION

Figure 1:
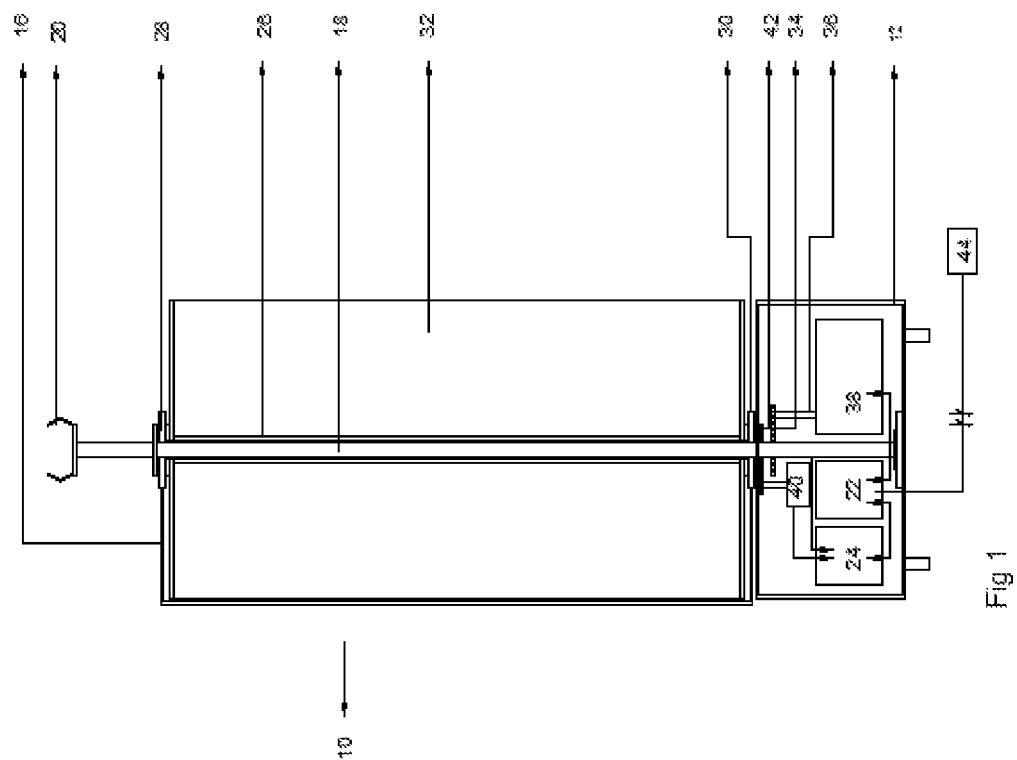
FIG. 1 is a side sectional perspective view of an example of a wind turbine generator.
Figure 2:
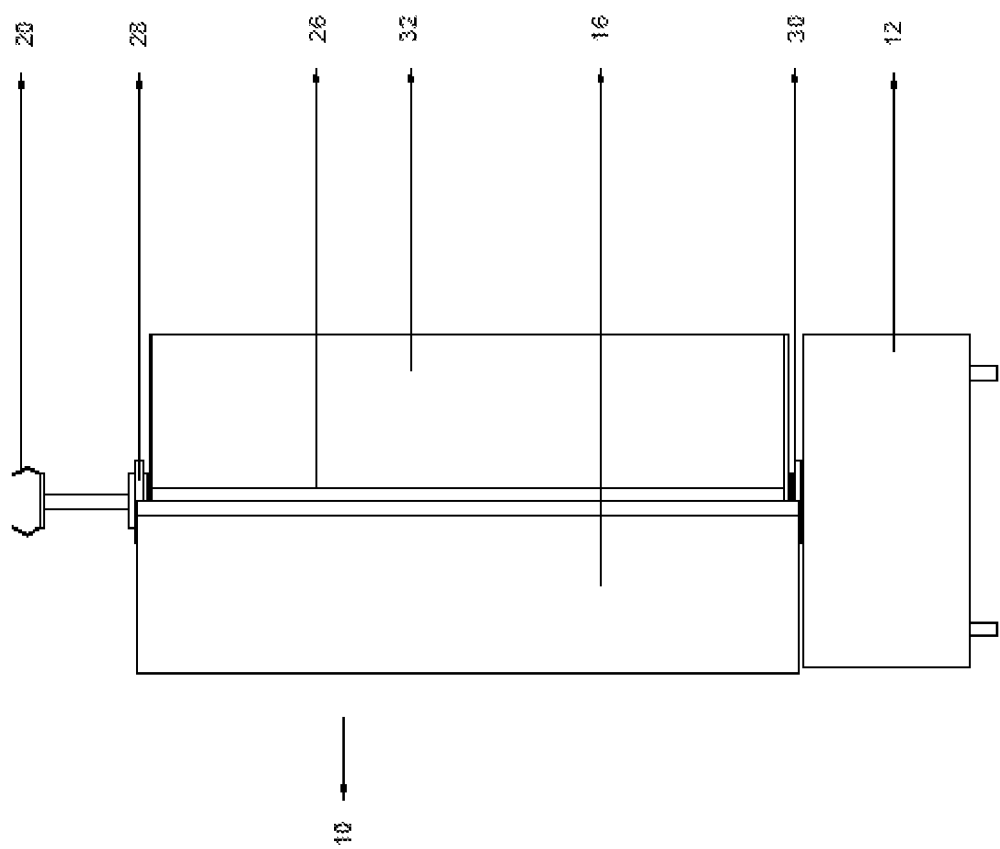
FIG. 2 is a side perspective view of the wind turbine generator from FIG. 1.

Referring now to the drawings and particularly to FIGS. 1 and 2, a wind turbine generator 10 is shown. In use, the wind turbine generator 10 is typically mounted on a surface with adequate strength to hold the weight of the wind turbine generator 10 and withstand mechanical loads caused by rotation, wind and vibration. As shown, the preferred orientation of the wind turbine generator 10 is a vertical placement.

As shown, a base 12 supports a rotor assembly 14, a housing 16 and a central support 18. In the example shown, the central support 18 is stationary and supports an anemometer 20 mounted on top of the central support 18. The anemometer 20 is operatively connected to a control device 22 and a reserve power source 24. The control device 22 controls the operation of the anemometer 20 and the reserve power source 24 is used to operate electrical functionality within the wind turbine generator 10 when the power generated by the operation of the generator 10 does not support the operation of the electrical functions. Further, the control device 22 and reserve power source 24 may be used to pass a charge to the anemometer 20 to heat the anemometer 20 to operate in weather conditions where the temperature is below a predetermined threshold level. It is contemplated that in certain embodiments, the reserve power source 24 may increase or decrease the power delivered to the control device 22 to support necessary functions. For example, the power level may be increased at fixed intervals when the wind speed and direction information is scheduled to be checked.

As further shown in FIG. 1, a rotor shaft 26 is provided including a top thrust bearing 28 and supported by a bottom thrust bearing 30. The rotor shaft 26 is mounted concentrically on the central support 18 with additional support from the thrust bearings 28 and 30. The rotor shaft 26 includes numerous blades 32 depending therefrom. The blades 32 are disposed in a radial manner with a design intended to increase aerodynamic efficiency and reduce chop generated by the rotation. The rotor assembly 14 is thus formed of the rotor shaft 26 and multiple blades 32 attached to the rotor shaft 26. In use, the wind will be incident on the blades 32, thus producing rotational force. The rotor assembly 14 is mounted on the top thrust bearing 308 and bottom thrust bearing 30, which allows for generally free rotation. The shape and design of the blades 32 may be streamlined to reduce drag and increase the rotational power provided to the rotor shaft 26, as will be understood by a person skilled in the art in light of the disclosure provided herein.

As further shown, a power transfer mechanism 34 is attached to the rotor shaft 26 to transmit power to a follower mechanism by gearing or a belt and pulley mechanism. The mechanical power is transferred to an input shaft 36 of an electric generator 38. It will be clear to a person skilled in the art that the power transfer mechanism 34 may be embodied in many varied forms including, but not limited to, direct-drive gears and multiple gears arrangements.

A drive motor 40 is provided to rotate the housing 16 around the vertical axis of the wind turbine generator 10, as described further herein.

Figure 3:
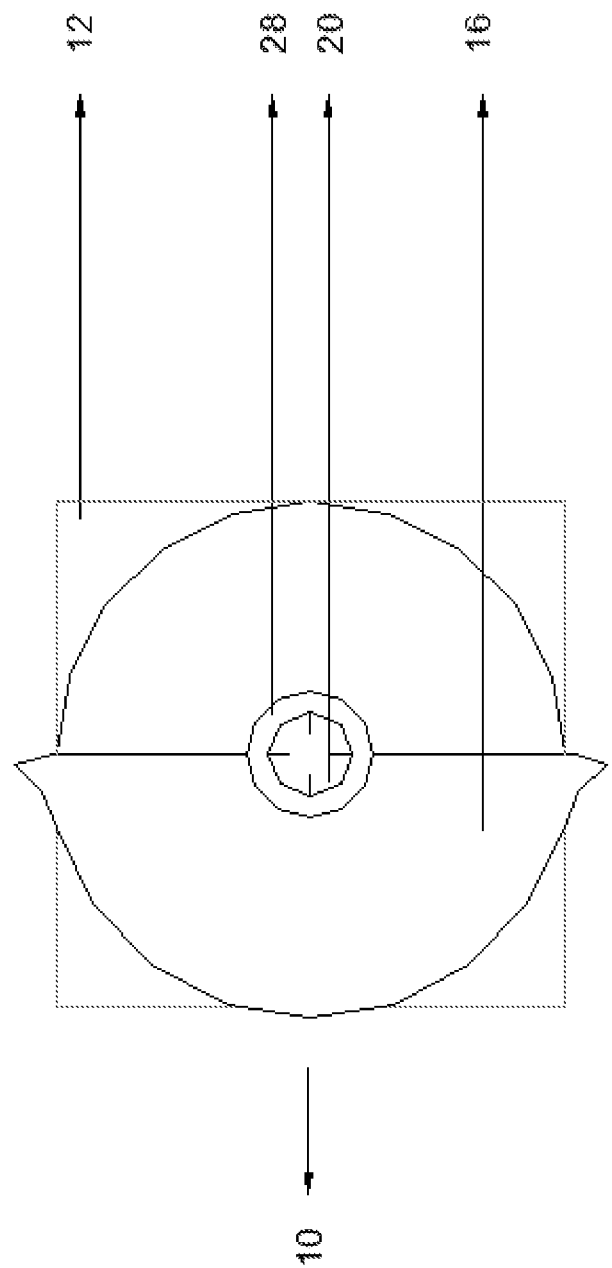
FIG. 3 is a top perspective view of the wind turbine generator from FIG. 1.

Referring now to FIG. 3, the anemometer 20 is mounted clear of any obstacles to measure the wind speed and direction. The wind speed and direction information is transmitted to the control device 22 located in the base 12. The control device 22 includes logical algorithms to calculate whether the wind turbine generator 10 is working at optimal efficiency. The control device 22 may further transmit signals to a drive motor 40 to reorient the housing 16, as required. The housing 16 is shaped to reduce drag forces and provide for smooth airflow around the blades 32 by reducing the vortex generation around the blades 32 and reducing the direct force on the blades 32.

The anemometer 20 also communicates with the control device 22 to present wind speed and direction in an electrical code to be deciphered by the control device 22 to accurately compile the data. The anemometer 20 data is translated by the control device 22 using logical algorithms to check the wind speed to make sure any extraneous information like wind gusts and sudden or quick change in wind direction is accounted for when calculating the required/desired orientation of the housing 16. The control device 22, drive motor 40 and anemometer 20 are powered by the reserve power source 24.

Figure 4:
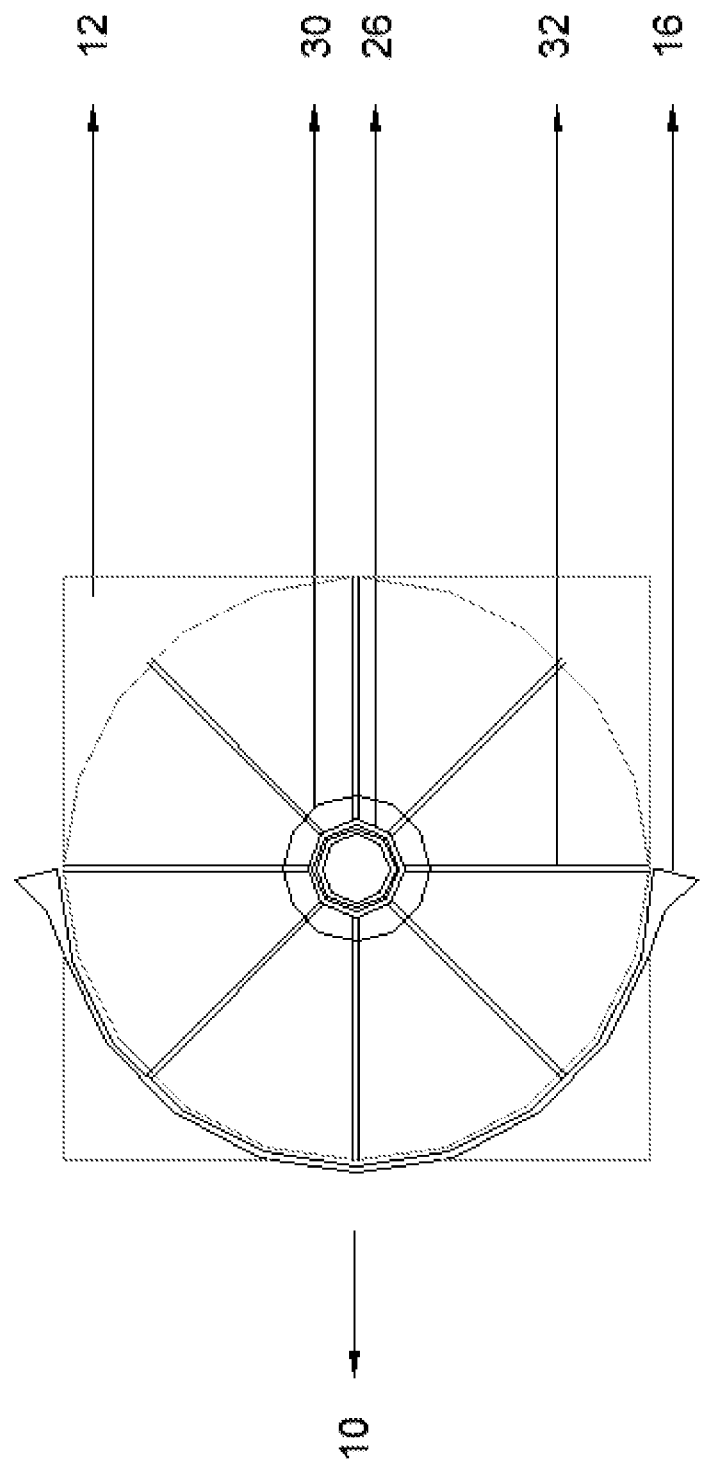
FIG. 4 is a top sectional perspective view of the blades and rotor of the wind turbine generator from FIG. 1.
Figure 5:
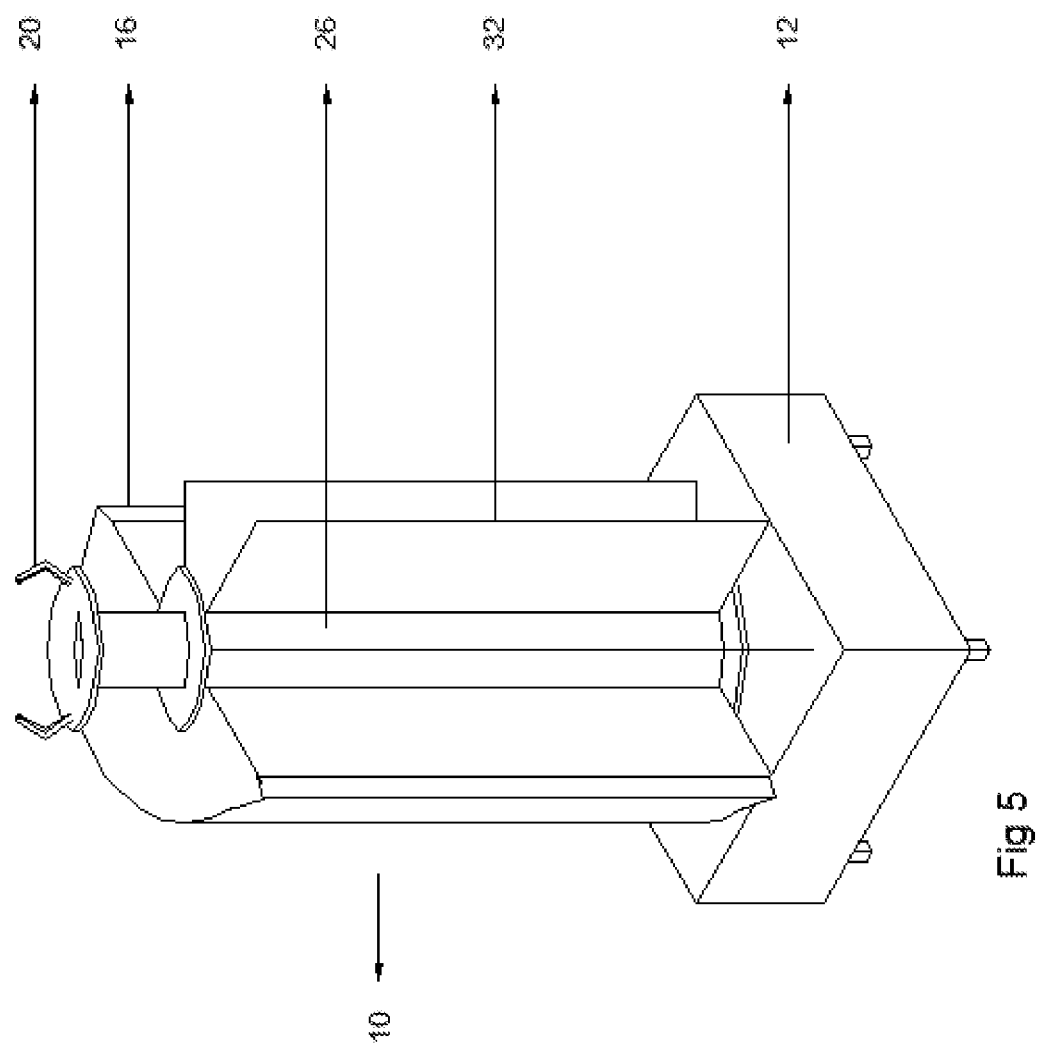
FIG. 5 is a perspective view of the wind turbine generator assembly from FIG. 1, illustrating the casing and exterior view.

Referring now to FIGS. 4 and 5, the control device 22 compares the wind speed and the rotational speed of the rotor assembly 26 and 32 to ascertain whether the wind turbine generator 10 is working at its optimum level and to move the housing 16 via the drive motor 40 at regular intervals to the calculated optimal position. When the housing 16 should be moved the drive motor 40 rotates the housing 16 via the power transfer mechanism 42 and then locks and holds the housing 16 in position with a locking mechanism 44 to prevent the housing 16 from moving or rotating due to the wind or other forces incident on it. The locking mechanism 44 is controlled by the controlling device 22 and is actuated based on a signal from the controlling device 22. The locking and unlocking process may be synchronized with the movement of the housing 16. The control device 22 will signal the locking mechanism 44 to open to allow the housing 16 to be rotated. The housing 16 can be moved only when the locking mechanism 44 is disengaged and the locking mechanism 44 will be activated to stop the housing 16 from moving after the required movement is complete. The control device 14 may be programmed to derive the wind speed and direction information at a fixed predetermined interval and store this information to be retrievable by electronic data processing aid.

The control device 22 may also check the reserve power source 24 to ascertain whether it has sufficient power reserve. If the power level available in the reserve power source 24 falls below a certain threshold value, the control device 22 may divert power from the generator 38 via a switch or similar mechanism. When the power level in the reserve power source 24 is higher than a predetermined value, the flow of power to the reserve power source 24 will be cut-off and the power generated by the generator will flow to the power output circuit 17. The control device 14 may be programmed to check the available electrical power parameters in the reserve power source 24 at a fixed predetermined interval and store this information to be retrievable by electronic data processing aid. The electrical devices and switches that may be used to charge the reserve power source 24 are also included in the wind turbine generator 10. These electrical switches and components are generally known to one skilled in the art and thus will not be discussed further.

The control device 22 may also monitor the wind speed and direction information transmitted by the anemometer 20 and the rotational speed of the rotor assembly 14. If the rotor speed is zero and the incident wind speed is higher than a threshold value, the control device may determine that the rotor 4 should be in motion. If the control device 22 determines the rotor assembly 14 should be in motion, then it will switch open the power flow from the reserve power source 24 to start the rotor assembly 14. The control device 14 may be programmed to derive the wind speed and direction information from the anemometer 20 and compare against the rotational speed of the rotor 4 at a fixed predetermined interval and store this information to be retrievable by electronic data processing aid. The electrical devices and components that may increase the flow of power to the generator 38 are generally known to one skilled in the art and thus will not be discussed further.

The control device 22 may also monitor the wind speed and direction information transmitted by the anemometer 20 and compare the rotational speed of the rotor assembly 14 to determine whether the wind speed is higher than a threshold value. If the rotational speed is above the threshold, the control device 22 may decide the rotor 4 should not be in motion. If the control device 22 completes the check and the rotor 4 is in motion at a speed greater than the predetermined threshold, the control device 22 may close the switch for the power flow to the generator 38 to avoid damage to the generator 38. If the speed of the wind is above a certain predetermined threshold level, then the control device 22 will also signal the reserve power source 24 to switch the power flow to the generator braking system to clamp or lock the generator shaft 36 from turning, thus preventing the rotor 4 from turning. The electrical devices and components, which will switch the flow of power from the generator 38 are generally known to one skilled in the art and thus will not be discussed further.

FIG. 6 illustrates an alternate embodiment of the wind turbine generator 10 and is provided to describe an example of alternate rotor layouts with lift type rotor blades 32. With this layout, the wind turbine generator 10 will have the same layout and schema as the embodiment described with respect to FIGS. 1-5, but the layout and type of blades 32 used in the wind turbine generator 10 will be visibly different. As shown, the blades 32 will be shaped like an airfoil that is oriented in a circumferential direction and the blades 32 are attached to the rotor shaft 26 by horizontal supports 46.

The above description embodies the general spirit of the invention and the schematic relationships for the parts of the invention, to include variations in size, schema, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, various changes in layout, size, shape and structure and departures may be made to the invention without departing from the spirit and scope thereof. Thus it is not intended that the invention be limited to what is described in the specification and illustrated in the drawings, rather only as set forth in the claims.

We claim:

1. A wind turbine generator comprising:
a rotor including a substantially vertical shaft and plurality of blades radially extending from the shaft, wherein the rotor is characterized by a breakaway torque that is greater than the torque required to maintain rotation;
a generator operationally coupled to the rotor shaft;
a rotatable airfoil shaped housing enclosing at least a portion of the rotor blades and exposing at least a portion of the rotor blades;
a motor mechanism distinct from the generator operatively coupled to the rotor shaft;
a reserve power source operatively coupled to the motor mechanism;
one or more sensors adapted to determine wind speed; and
a processor operatively coupled to the one or more sensors and the motor mechanism, wherein, in reaction to input received from the one or more sensors, the processor provides a control signal to the motor mechanism to assist the rotation of the rotor shaft when the wind speed is below the speed needed to induce breakaway torque and above the threshold required to rotate the rotor once the initial resistance is overcome, wherein, when assisting the rotation of the rotor shaft, the motor mechanism is powered by the reserve power source, wherein the reserve power source is controlled by the processor to recharge based on a charging schedule provided by the processor.

2. The wind turbine of claim 1 further including a control mechanism operationally coupled to the processor and airfoil, wherein the one or more sensors are further adapted to determine wind direction, further wherein the control mechanism receives a control signal from the processor to rotate the housing based on wind direction as determined by the one or more sensors.

3. The wind turbine of claim 2 wherein the housing rotates to be oriented to reduce drag on the side of the rotor which is moving against the direction of the wind and provide additional rotational force on the side of the rotor which is moving in the same direction as the wind flow, due to pressure differential effect from the airfoil.

4. The wind turbine of claim 1 wherein the processor provides a control signal to the motor mechanism to restrict the rotation of the rotor shaft when the wind speed is above a predetermined speed.

5. The wind turbine of claim 1 wherein the charging schedule is based on wind speed determined by the one or more sensors.

* * * * *